Patented Nov. 24, 1931

1,833,493

UNITED STATES PATENT OFFICE

TREADWAY B. MUNROE AND ELBERT C. LATHROP, OF CHICAGO, ILLINOIS, ASSIGNORS, BY DIRECT AND MESNE ASSIGNMENTS, TO THE CELOTEX COMPANY, OF CHICAGO, ILLINOIS, A CORPORATION OF DELAWARE

PRESERVATION OF VEGETABLE MATERIAL IN STORAGE

No Drawing.   Application filed December 26, 1928.   Serial No. 328,616.

This invention relates to a method and means of preserving vegetative products in storage particularly in large masses. The materials to which this invention relates are plant products containing among other substances carbohydrates, sugar, waxes and resins and which, as obtained for storage or as stored, have a relatively high water content. The invention in particular relates to materials which when prepared for storage, have a water content in the amount of at least 35 to 40% and upwards.

The substance of this invention relates particularly to the preservation of season-ably produced vegetation products employed for the production of a pulp used in the manufacture of fibrous wallboard and for other known uses and manufactures wherein such raw materials are useful.

The invention will be described particularly in connection with storage and preservation of sugar cane bagasse but there are numerous other materials in connection with the storage of which the teachings of this invention may be applied. For instance, corn and sorghum fiber may be successfully stored, and uncured or wet hay may be stored in accordance with the methods herein described. In fact this invention may be successfully applied to the storage of any vegetative substance containing as its constituents materials which in their processes of decomposition, under the influence of micro-organisms, produce heat and which under the conditions of storage initially contain water in the amount of about 35% and upwards.

A particular object of this invention is to provide a method and process of storage of vegetation products which, under present known methods of storage, deteriorate through the action of micro-organisms, with an accompanying production of heat. Further an object of this invention is to provide a process which will be more certain in action and more economical in results than those heretofore used and proposed.

With these and other objects in view the invention consists in the novel steps constituting the process all as will be more fully hereinafter disclosed and particularly pointed out in the claims.

In order that the invention may be clearly understood it will be described in detail in connection with storage and preservation of sugar cane bagasse as an example, but it is to be understood that the principles herein stated are generally applicable to materials as broadly stated in the statement of the objects of this invention. Sugar cane bagasse, which is the residue resulting from crushing and pressing of the juice from sugar cane, contains in addition to fibrous material a small amount of unextracted sugar, carbohydrates, pentosans, gums or resins, certain minerals, compounds and water, the water in general amounting to 55 to 60%, of the total by weight. In the case of sorghum, corn stalks, green or wet hay and the like the water content will vary and in general this process is not applicable unless the water content of the substance is in excess of 25%. Whereas it has just been stated that this process is not applicable in cases where the water content is less than 25% it is to be understood that this figure is not set and unvariable.

The process is applicable in any case of storage in which the material stored will, at the water content and temperature of storage, support the growth of micro-organisms which in their life processes generate heat.

If the bagasse or other material were dried immediately after leaving the mill or otherwise obtained in a relatively dry condition, very little, if any change in the mass would be subsequently brought about by the action of micro-organisms, it being well known that they require water in order to grow and carry on their process of destruction. Drying of the material has proven to be too costly to be practicable and it has been found that for handling material into and out of storage it is practically imperative that it be baled, or compacted into handleable units.

Bagasse and the like, almost immediately after its production and especially when in mass, particularly has set up therein the growth of micro-organisms constituting fermentation. These fermentations are initially in the nature of alcoholic, acetic and lactic fermentations and it has been hitherto impossible to prevent such fermentation at a reasonable cost or without some objectionable feature, particularly in connection with storage in mass. During the initial stages of the fermentations consuming the sugars, carbohydrates and gums, no damage appears to be done to the fiber of the mass but probably these fermentations in their latter stages, and certainly subsequent fermentations, definitely attack the cellulose and destroy the fiber. In the past, for the preservation of organic materials, various chemicals have been employed in solution and in powder form but in every instance the object of the treatment has been to add sufficient chemical to prevent the growth of micro-organisms through application of amounts sufficient to constitute a toxic strength.

Prevention of growth of micro-organisms, under different conditions as regards temperature, culture medium, moisture presence and tolerance of toxic substances, requires considerable variation in the amount of disinfectant or toxic substance necessary to inhibit such growths. It is substantially impossible to determine just how much toxic material must be used to protect a material except by large scale experiments under the conditions which will actually be met and this is particularly so due to the uncertainty as to just what micro-organisms contribute to the deterioration of the particular material to be stored. Large scale experiments have been carried on in connection with the storage of sugar cane bagasse and the underlying principles, hereinafter stated, for successful storage have been determined, said principles having been found also applicable to all classes of materials which may be stored in accordance with the disclosures herein.

The basic underlying principle, of general application, involved in this invention is that plant growths of vegetative matter, containing sufficient moisture to sustain micro-organisms whose life processes comprise fermentation, can be successfully stored in mass without preliminary treatment other than the addition of a small amount of toxic substance or disinfectant if the storage is so planned and executed that advantage is taken of the heat of plant respiration and/or the heat produced by fermentation, as well as advantage taken to a certain extent of natural diffusion.

For the storage of the materials in mass it is convenient and almost necessary that the materials be formed into bales. Loose material will be blown away and the storage of large amounts of such material, in loose form, would cover a tremendous area and the sides of such piles must slant steeply inwardly in order that the material will not slide. It is to be understood that storage of loose material is possible by making small piles or by providing ventilating flues through the pile. As distinguished from storage of loose material this invention contemplates that the material be compressed into bales of a convenient size and weight. A convenient size of bale has been found to be roughly 16" x 18" x 32" in dimensions and compressed to a density of approximately 50# per cu. ft. Bales of this size are of convenient weight, stack well and are readily made.

In considering the storage of bagasse it has been found that the material promptly baled after the expression of the juices has about a 60% moisture content. At the most, within a day or two after baling, it is evident that micro-organisms are active as is evidenced by an alcoholic odor arising from the baled material. The initial fermentations generate a certain amount of heat in the destruction of the residual sugars, carbohydrates and gums and according to this invention this heat generated is made use of, in drying out the baled and piled material, by raising the rate of diffusion of water vapor from the wet stored material to the surrounding drier air.

The baled material is formed into large stacks which, after consideration of fire protection, amount to be stored, convenience of building and tearing down and the like, have been determined at dimensions of approximately 60' x 100' by 22' high. Such a pile will contain roughly 12,000 bales comprising some 1,400 tons of material of which about 60% is water. The piles of course can be varied in size and shape but as it is desired to utilize the heat of fermentation it is advisable to have the pile of considerable mass and of a shape to have a relatively small surface compared to the mass. The pile should cover an area approaching a circle as distinguished from a long narrow pile which would have a large exposed surface relative to its mass. In building these piles the bales in the outer rows are packed closely together to form firm retaining walls but a number of ventilating channels are provided; for example at every fourth or fifth bale a 4 to 6 inch ventilating channel is provided by spacing the bales. In the interior of the pile the bales are more or less random laid to allow rather free interior circulation of air. When the top of the pile is reached a level row of bails is laid with a 4 to 6 inch vent every fourth or fifth bale. The top can be pitched or peaked but should be in regular arrangement the bales closely packed except for the provision of ventilating channels as described.

In the formation of the bales, means are provided whereby there is, as evenly as possible, distributed on the raw material a disinfectant toxic to micro-organisms which in the case of boric acid is added in an amount of about 25 pounds per ton of dry material, in this case about ½% of the storage weight.

Other substances toxic to micro-organisms may be added in place of boric acid in which case such are added in amounts proportional to their toxicity relative to boric acid.

Since the raw material has initially a water content of about 60% the act of compressing it into a bale will tend to thoroughly and evenly distribute the disinfectant throughout the bale, since the greater portion of the disinfectant is now in water solution. It has been determined that a concentration of disinfectant as above mentioned, about 1–1¼% of the dry weight of the stored material, can be and is tolerated by substantially all the organisms destructive to cellulose encountered under normal conditions of storage, such toxicity being tolerated by the micro-organisms comprising not only alcoholic, but acetic and lactic acid fermentations as well.

If the baled material is promply placed in storage piles, the heat of respiration and oxidation and that accompanying the acetic, alcoholic and lactic fermentations will cause an appreciable rise in temperature of the pile. A pile of this material will lose water by normal evaporation but when further heated as described the rate of evaporation is increased. Ventilating channels having been left in the pile, the vaporized water vapor can escape and in fact, for some little time after formation, a haze of this evaporated moisture can be seen rising from the top of the pile. The heating of the pile has several results, the least resistant micro-organisms are destroyed by the heat and the water content is lowered. The lowering of the water content has two effects; one of which is to increase the disinfectant concentration to a point when it is toxic to the micro-organisms while the other is to reduce the water content to an amount which will not support life in the micro-organisms, or at least, to reduce it to an amount insufficient for active propagation.

While the raw substance does heat up as described it is to be noted that it does not heat to the extent that untreated material will, nor does it heat as much as material to which calcium oxide, a heat producing material, has been added. In fact, calcium oxide added to the fibrous material will generate sufficient heat in the mass to partially cook the fibers, whereas this invention contemplates only their preservation by toxicity. With other known preservation methods there has always been great danger of the temperature of the mass rising to such point that the fibers are scorched and weakened and in fact it is well known that hay not fully cured will, under favorable conditions, spontaneously ignite. It has been found advisable to erect over the piles when formed a roof or covering of some sort to protect the top from rain. The effect of rainfall is to decrease the concentration of disinfectant according to the amount of rain which soaks into the top, and in those portions which are wet the disinfectant will not be in sufficient concentration to, in view of the high water content, prevent growth of micro-organisms. With protection from rainfall a pile once dried, meaning evaporation of the moisture to a water content for the pile of some 35 to 40%, will be fully protected and can be held almost indefinitely.

As an example of other chemicals which may be used attention is directed to the alkali, alkaline earth metals, copper, zinc and other heavy metal salts of hydrofluoric acid, fluosilicic acid, borofluoric acid and the like as suitable. In addition organic compounds such as sodium dinitrophenolate, beta napthol and other well known disinfectants are available. These disinfectants are to be used in the amounts previously stated, that is, in amounts equivalent, in toxicity, to the amount of boric acid stated.

It will be seen that there has been described a method of storage of vegetative products whereby through the exercise of the invention as outlined there is provided storage which is cheap yet effective and which in actual mass experiment has produced a yield 10 to 15% greater than that of similar untreated material stored in similar form and under the same conditions. It will be further seen that there is comprehended in this invention a coordination of chemical and physical phenomena, one supplementing the other whereby results are obtained which are far superior to those obtained by any other known method of preservation at a commensurate cost.

There is involved in the generation of heat in the mass of stored material not only heat due to fermentation but heat generated by respiration and oxidation of the raw material, but as these actions are probably due to the life processes of micro-organisms they are not separately considered.

It is to be particularly noted that this invention is directed broadly to the preservation in storage of vegetative material which contains when stored a relatively large amount of moisture. The invention broadly comprehends controlled utilization of the phenomena accompanying the life processes of micro-organisms whereby heat generated in the progress of such processes is employed in conjunction with a limited amount of a material toxic to micro-organisms to check and eventually destroy them before they cause appreciable deterioration of the stored material.

It is obvious that those skilled in the art may vary the steps and combinations of steps constituting the method as well as the details of carrying out the steps without departing from the spirit of the invention, and therefore it is not desired to be limited to the foregoing disclosure except as may be demanded by the claims.

What is claimed is:—

1. The process of preventing the natural fermentation of a mass of raw bagasse fibers, for pulp making purposes, which consists in distributing in the interior of said mass a quantity of a disinfecting compound in the proportion of about 25 pounds per ton bone dry fiber, forming said mass into a bale and thereafter increasing the concentration of the disinfectant within the bale by decrease of the moisture content thereof.

2. The process of preventing, in storage, fermentation in a mass of fiber of high initial moisture content which consists in applying to the interior of the mass about 1¼% by weight powdered boric acid as compared to bone dry material, the formation of the material into bales and subsequently causing a decrease in the moisture content whereby concentration of the boric acid is increased.

3. The process of preserving the natural characteristics of a mass of bagasse fibers containing moisture which consists in applying dry boric acid to the interior of said mass in quantities sufficient initially only to retard the natural fermentation thereof, baling under pressure the mass containing the boric acid and thereafter decreasing the moisture content.

4. The process of preserving in storage materials comprising products of plant growth, having when prepared for storage a moisture content sufficient to support the life processes of micro-organisms, wherein the material is arranged in mass, the mass presenting regularly arranged outer surfaces with provision for ventilation of the interior thereof, the material is partially dried by heat generated by the life processes of micro-organisms within the mass to a moisture content at which with the presence of a substance toxic to micro-organisms and in an amount having a concentration equivalent to not more than 1½% boric acid per ton based on the dry weight of the material, further life of micro-organisms within the mass is arrested and prevented without loss of fiber strength, the concentration of toxic being insufficient to prevent initial fermentation in the mass whereby the heat generated in initial fermentation is utilized to condition the material to prevent fermentations destructive to the fiber content thereof.

5. The method of storage of products of plant growth wherein the concentration of a substance toxic to micro-organisms, whose life processes comprise fermentation, added to the stored material is in an amount insufficient to prevent the growth of micro-organisms in the material at its moisture content at the time of storage and whereby heat generated through initial fermentations in the material, moisture is evaporated therefrom consequently increasing concentration of the toxic substance to an amount which is sufficient to prevent further fermentations at the resulting moisture content and concentration of toxic but insufficient to attack the fibers of said material.

6. The method of storage of products of living plant growth having a high moisture content whereby such materials are stored in mass with protection from direct moisture precipitation and wherein there is added to the material a disinfectant toxic to micro-organisms whose life processes comprise fermentation, said disinfectant in an amount less than sufficient to prevent fermentation at the moisture content and temperature of initial storage and whereby through heat generated in initial fermentations in the material and through diffusion, moisture is evaporated therefrom consequently increasing concentration of the toxic substance to an amount which is sufficient to further fermentations.

7. A mass of products of plant growth having a low heat generating disinfectant in its interior in an amount having a toxicity equivalent to approximately 1¼% boric acid based on dry weight of the material of the mass.

8. A mass of living products of plant growth, comprising a plurality of unit masses arranged in a pile to form ventilating channels therethrough, a substance toxic to micro-organisms in the mass the toxic substance present in an amount having a toxicity comparable to that of boric acid amounting to approximately 1¼% of the weight of dry plant material in the mass.

9. A mass of moisture containing living plant material comprising a pile thereof having ventilation channels therethrough and protected from receiving additional moisture, a substance toxic to micro-organisms within the mass the toxic present in an amount insufficient to prevent the life processes of the micro-organisms in the presence of a moisture content of approximately 40% but in an amount sufficient to prevent the life processes of the micro-organisms at a lower moisture content.

10. A compressed bale composed of sugar cane bagasse or like plant material having associated therewith unextracted sugars and other fermentable organic matter, the bale as formed having a moisture content of about 50%; a dry water soluble fungicide distributed through the material of the bale prior to the formation thereof, the fungicide thereafter entering into solution in the natural water content of the bale, in alcohol formed therein through fermentation and in the water formed through the life processes of the organisms of fermentation, all whereby the osmotic pressure within the bale will be increased.

11. A compressed bale composed of sugar cane bagasse or like plant material having associated therewith unextracted sugars and other fermentable organic matter, the bale as formed having a moisture content of about 50%; boric acid in the amount of approximately 1.25% of the weight of the bale distributed through the material of the bale prior to the formation thereof, the fungicide thereafter entering into solution in the natural water content of the bale, in alcohol formed therein through fermentation and in the water formed through the life processes of the organisms of fermentation, all whereby the osmotic pressure within the bale will be increased.

12. The process of preserving the natural characteristics of a mass of bagasse fibers and the like containing unextracted sugar and a relatively high percentage of moisture which consists in applying to the interior of the mass, prior to baling, a water soluble fungicide in an amount insufficient to prevent alcoholic fermentation, but sufficient to prevent other and further deleterious fermentation.

In testimony whereof we affix our signatures.

TREADWAY B. MUNROE.
ELBERT C. LATHROP.